United States Patent [19]
Ellison

[11] Patent Number: 5,395,537
[45] Date of Patent: Mar. 7, 1995

[54] METHOD FOR REMOVING SOLIDS FROM AQUEOUS WASH SOLUTIONS

[76] Inventor: Billy L. Ellison, 165 Santa Clara St., Brisbane, Calif. 94005

[21] Appl. No.: 262,418

[22] Filed: Jun. 20, 1994

Related U.S. Application Data

[62] Division of Ser. No. 936,191, Aug. 26, 1992, Pat. No. 5,324,425.

[51] Int. Cl.⁶ .................... B01D 21/26; B01D 36/00
[52] U.S. Cl. .................... 210/787; 210/805; 210/806; 210/295; 210/167
[58] Field of Search ............... 210/787, 800, 805, 806, 210/167, 258, 295, 304, 512.1

[56] References Cited

U.S. PATENT DOCUMENTS

| | | | |
|---|---|---|---|
| 3,923,658 | 12/1975 | Lancaster | 210/108 |
| 4,399,041 | 8/1983 | Rappe | 210/787 |
| 4,425,228 | 1/1984 | Lynn et al. | 210/787 |
| 4,636,317 | 1/1987 | Lewis | 210/787 |
| 4,954,222 | 10/1990 | Durr et al. | 210/167 |
| 5,047,157 | 9/1991 | Hoffman et al. | 210/787 |
| 5,062,963 | 11/1991 | Marcinkowski et al. | 210/167 |
| 5,230,793 | 7/1993 | Lenhart et al. | 210/167 |
| 5,249,511 | 10/1993 | Schumate et al. | 210/167 |

*Primary Examiner*—Robert A. Dawson
*Assistant Examiner*—David Reifsnyder
*Attorney, Agent, or Firm*—Graham & James

[57] ABSTRACT

A method and apparatus for removal of solids from aqueous wash solutions such as, but not limited to, solutions used in hot jet-spray parts washers. Coarse solids are removed by a vortex separator during all operations. Solids accumulated in the parts washer storage tank are intermittently removed and fine solids are removed by intermittent depth filtration. In one embodiment of the invention, the method includes the purging of the vortex separator to the primary stage of depth filtration.

11 Claims, 5 Drawing Sheets

METHOD FOR REMOVING SOLIDS FROM AQUEOUS WASH SOLUTIONS

This is a division of application Ser. No. 07/936,191, filed Aug. 26, 1992, now U.S. Pat. No. 5,324,425.

BACKGROUND OF THE INVENTION

The invention generally relates to a method and apparatus for removing solids from aqueous wash solutions, and more particularly to a method and apparatus for removing solids from wash solutions used in hot jet-spray parts washers and the like.

Wash solutions are used in recirculating washer devices constructed for cleaning industrial parts. In these devices, the wash solution is usually sprayed across the device being cleaned at high pressure to help dislodge solids and residue from the components being cleaned. The wash solution is then discharged from the washer tank through a filter before returning to recycle through the washer.

The particular pump used in typical washer systems must be strong enough to move the solution through the filter while maintaining the necessary flow pressure for efficient washing. This is problematic because the degree of filtration provided by a device is usually proportional to the pressure drop across the device. Thus, in some circumstances, multiple pumps are used to separately pump wash solution trough filtering devices and to provide the necessary jet spray pressure. Multiple pumps substantially increase procurement and operational cost of the washer system.

Depending upon the particular application suitable filters are required in recirculating washer systems to provide the necessary filtering of the wash solution as desired. For processing wash solutions where significant quantities of oil are present, removal of the oil is a prerequisite for filtration for removal of solids. In parts washers, this can be accomplished by use of a suitable oil skimmer such as that taught in U.S. Pat. No. 5,053,145 dated Oct. 1, 1991. Using this type of filtration alone for the removing of solids from aqueous solutions has not proved satisfactory due to the high filter maintenance required for removal of the entire solids load.

During the wash operation, various particulate matter in addition to oils, including sand, dust, wear metals, carbon and other contaminants dislodge from the components being washed. These materials vary in size and density, depending upon the particular application, and accumulate in the washer system during wash cycles. Heavier materials may settle out of the wash solution and collect on the bottom surface of the washer. Of course, these materials eventually must be removed. Typically, up to 90% of the particulate matter dislodged from the component being washed during the washing process are coarse enough (larger than about 100 microns) to settle out of suspension in the washer storage tank used in the system. In addition, when a washer system is turned off overnight or between shifts, particulate matter may settle to the bottom of the washer storage container and accumulate to a sludge. High pump capacity, or additional pumps, may be required to dislodge the sludge. The cost of procuring, maintaining and operating these high power pumps can be very high.

To avoid operating problems such as increased pump wear and reduced quality of cleaning that result from buildup of dislodged particulate matter, it has conventionally been the practice to dispose of wash solutions at intervals as short as two weeks. At one time, it was common practice to discharge dirty solutions to the sewer system, clean the washer storage of accumulated solids and recharge the system with clean solution.

The enactment of environmental legislation, such as the Resource Conservation and Recovery Act (RCRA), has resulted in regulations which prohibit disposal of aqueous cleaners in sewers and the like and specifically require special handling of contaminated industrial wash solutions. Most common wash solutions must now be treated as hazardous waste and disposed of in suitable fashion.

The increasing costs of hazardous waste disposal and the limited space for hazardous waste storage have created a need to increase the service life of wash solutions and reduce the volume of contaminated wash solutions requiring disposal. One solution is to provide systems having increased filtering capabilities to allow aqueous wash solutions to be used for longer periods of operational life.

Whenever filtering is increased, however, the effective flow of the wash solution is attenuated as previously described. Thus, when filtering is increased it is often necessary to also increase pump power. In conventional washer systems having only one pump for each washer cabinet, this would require procurement of a larger pump or addition of additional pumps for each washer system. The cost associated with such a modification is often cost prohibitive for smaller businesses.

For these and other reasons, there is a need for a system and method of removing particulate matter from aqueous wash solution in existing washer systems that can extend wash solution operational life without compromising the efficiency of the wash cycle and without requiring expensive additional pumps. Water filtration is very old.

SUMMARY OF THE INVENTION

In accordance with the present invention, an apparatus is provided for filtering particulate matter from parts washer systems and the like requiring only a single pump to facilitate multiple modes of operation which increase the service life of the wash solution being used. In the preferred embodiment of the invention, the apparatus is intended to be installed on existing parts washer systems, however, in alternative embodiments the apparatus can include a complete parts washer system with pump.

In the preferred embodiment of the invention, the apparatus includes a course filtration means in the form of a vortex centrifugal separator, a depth filtration means in the form of one or more depth filtration vessels and appropriate valves and plumbing for attachment to a hot jet-spray parts washer or similar device having a single washer pump. For purposes of this discussion, the washer is described having a spray mechanism in a washer cabinet configured to retain the parts being washed and a washer storage portion below for receiving and containing the wash solution flowing off the parts.

The apparatus is configured to provide three selectable flow paths of the wash solution recycling through the system. Each of the flow paths define a separate mode of operation. In each mode of operation, the wash solution is driven by a single pump and is recycled through a course filtration means to filter out particulate matter and solids generally bigger than 75 microns in size. In one mode of operation, the wash solution is channeled through the course filtration means and directed back to the parts washer through the spray mechanism used to clean parts. This is considered the normal washing mode.

In the second mode of operation, called the washer storage tank cleaning mode, the wash solution is directed to the washer storage container to provide turbulent wash solution flow in the container and carry accumulated particulate matter and solids which have settled to the bottom of the container out of the washer and into the wash solution flow where it is filtered by the course filtration means.

In the third mode of operation, called the depth filtration mode, the wash solution is directed from the course filtration means to a depth filtration means to provide filtration of particles smaller than that filtered by the course filtration means.

A method is also provided from removing particulate matter from aqueous wash solution using the three modes of operation to enhance service life of the wash solution and thereby decrease disposal costs. The invention provides an improved apparatus and method for using the apparatus that extends the service life of wash solutions used in hot jet-spray parts washers and similar devices up to a factor of ten in some circumstances over conventional systems.

Due to the filtration provided, the volume of waste requiring disposal is reduced to a relatively small volume of stable solids removed from the wash solution. These solids are much less likely to migrate and are more acceptable for storage than liquid waste. In addition the invention is simple to install, operate and maintain and does not require numerous expensive pumps thereby minimizing procurement and operating costs.

These and other features and advantages of the invention will become more apparent in the following detailed description in conjunction with the drawing appended hereto.

DETAILED DESCRIPTION OF THE ILLUSTRATIVE EMBODIMENTS

Figure 1:
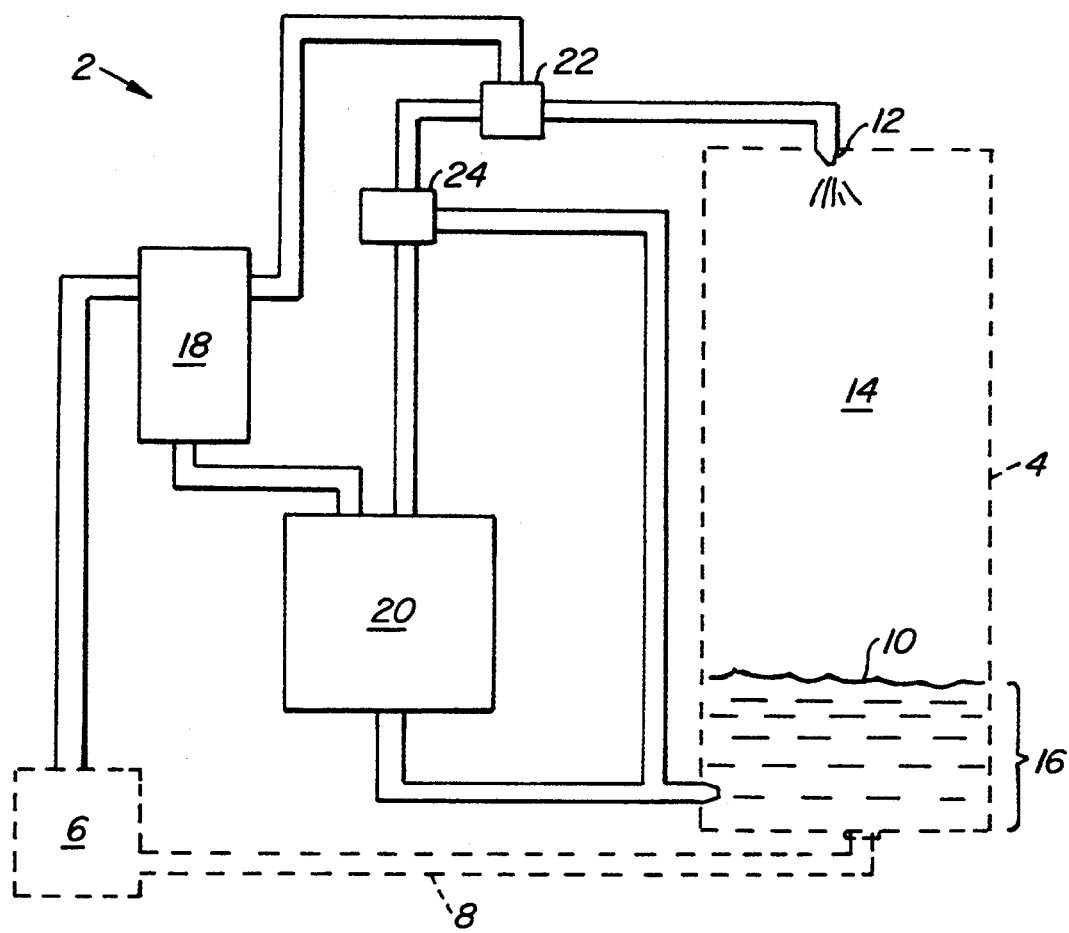
FIG. 1 is a general block diagram of the preferred embodiment of the invention having various components configured for retrofit onto an existing parts washer equipment illustrated in broken lines.

A general block diagram of the inventive apparatus is illustrated in FIG. 1. In the preferred embodiment of the invention, particulate matter filter system 2 is adapted to be retrofitted onto an existing washer 4 connected to pump 6 using suitable conduit means 8. Washer 4, pump 6 and conduit 8 are illustrated in broken lines to indicate that these components are not necessarily part of system 2 in that they may already exist at a particular facility where system 2 would be installed. There are thousands of existing parts washer or similar devices in use that would benefit from the system 2 providing increased service life of the wash solution 10 used in these devices. It should be noted, however, that an alternative embodiment of the apparatus includes washer 4 and pump 6 where existing equipment is not available.

The illustration provided in FIG. 1 is simplified for purposes of discussion. Washer 4 can be any commercially available hot jet-spray washer well known in the art and may include an oil skimmer for applications were oil well be encountered. Washer 4 typically includes a wash solution spray mechanism 12 for directing high pressure wash solution spray at the parts being washed in washer cabinet 14. After passing over the parts being washed, wash solution 10 collects in wash solution storage container portion 16 ready to be recirculated by pump 6 back to washer 4. System 2 is preferably configured with the necessary hardware to be retrofitted between washer 4 and pump 6 to provide various flow paths for wash solution 10 as will be described in more detail below. Depending upon the particular application and configuration of the components, pump 6 could be upstream of system 2 or downstream of system 2.

Likewise, it would also be possible to embed pump 6 in washer 4 or within the plumbing of system 2 where appropriate. Regardless of location, it is an important feature of the invention that only one pump is required for operation of system 2. That is, when a suitable pump is selected having the appropriate specifications, only one such pump is needed to drive wash solution 10 through the available flow paths in system 2. More than one pump means could be used, if desired, but would therefore require additional electrical outlets, increased electrical consumption and the additional cost and effort to maintain more than a single pump. Thus, economic advantages of system would be diminished.

System 2 generally includes course filtration means 18, depth filtration means 20 and means for selectably directing the flow path of wash solution between the course filtration means 18 and the washer 4. In the preferred embodiment, the selectably directing means includes two selectable valves 22, 24 and appropriate flow conduits or piping.

Course filtration means 18 and depth filtration means 20 can be any suitable filtering device suitable for the particular application. Modern filters now include twelve major types available from 150 U.S. manufacturers alone. Most are also available from foreign sources.

Of the various filtering devices available, including plate filters, cartridge filters, bag filters, pressure leaf filters, rotary drum filters and vacuum filter belts, all have their specialized uses. Depending upon the type of washing and the anticipated particulate matter to be encountered, some filtering systems are better than others. For example, conventional screens/strainers are commonly used in parts washer systems but do little to extend wash solution life. For the particular range and quantity of solids loading usually found in aqueous wash solutions, bag filters have proved most suitable for removal of fine solids (generally less than 75 microns). Like most membrane type filters, however, bag filters are not effective when significant quantities of oil are present.

Centrifuges of several types are very effective in removal of solids from various types of solutions. However, they can very expensive both in initial cost and in operation and maintenance. This is also true for hydrocyclone filtration.

The hydrocyclone is particularly well suited to separation of high solids load fluids. However, this characteristic is paid for in pumping energy and high pressure drop across the hydrocyclone. For applications such as the present invention, the use of a hydrocyclone would be a poor choice because of the need to retrofit existing washers with limited power and pressure capabilities.

Centrifugal vortex separators are particularly well suited to removal of coarser solids (larger than about 75 microns) with densities about 1.8 from aqueous wash solutions. This type of separator has the added advantages of low pressure drop when installed in-line and negligible maintenance cost. Unfortunately, however, centrifugal vortex separators do not remove fine solids. Consequently, when used alone, it does little to increase the service life of wash solutions.

It is intended that in the preferred embodiment of the present invention, the solids load of aqueous wash solutions would seldom exceed 1% by weight. Therefore, the high solids load capability of a hydrocyclone is typically not necessary. As a result, the installation of a centrifugal vortex separator in-line as the course filtration means 18, using existing power and pump of the parts washer retrofitted with this invention, makes the best choice in most circumstances. Preferably, a vortex separator such as the LAKOS In-Line separator, available from Lakos Separators U.S.A., 1911 N. Helm, Fresno, Calif. 93703, or suitable alternative, is used in the present invention.

Regarding the filtration device selected as the depth filtration means 20 in the present invention, any suitable depth filtration device capable of filtration of particles smaller than approximately 75 microns (the typical limit of commercially available centrifugal vortex separators) could be used. In the preferred embodiment, at least one depth filtration vessel is used. For best results, two depth filtration vessels, connected serially, are used. In most washer applications, two stages of depth filtration are normally sufficient to maintain wash solution quality. However, if additional polishing is desired (i.e. for disposal cleanup), additional stages of filtration can be provided by manual substitution of filters in either one or two filter vessel installations.

Figure 5:
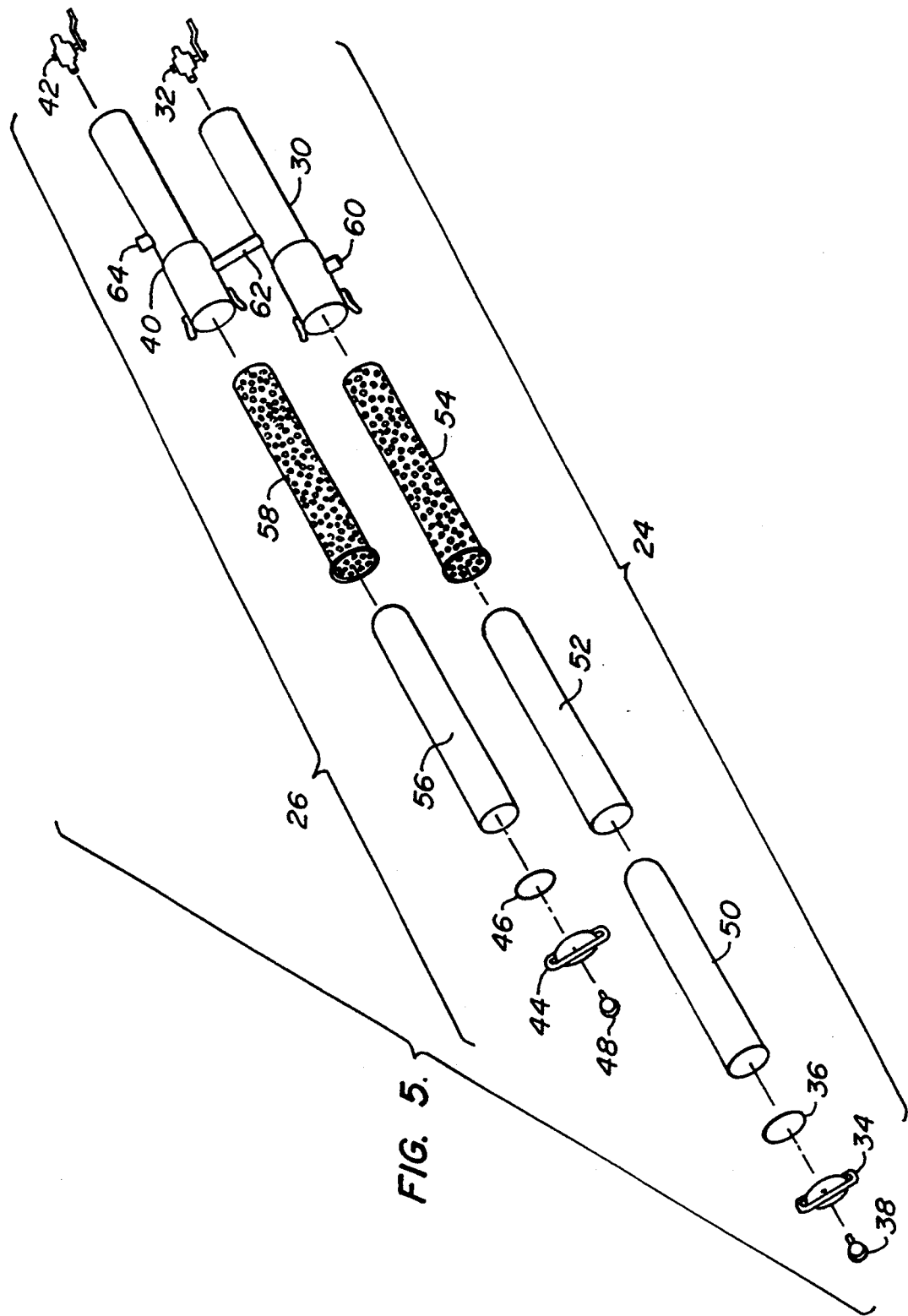
FIG. 5 is an exploded view of the preferred means for depth filtration having primary and secondary filter vessels.

FIG. 5 illustrates depth filtration vessels 26, 28 in exploded view. Depth filtration vessel 26 includes housing 30 having two-way drain valve 32 and cover 34. Cover 34 secures to housing 30 with a suitable O-ring 36 or other gasket type device to provide a pressure seal. A pressure gauge 38 is provided to monitor pressure which is an indication of filter collection. Likewise, depth filtration vessel 28 includes housing 40, drain valve 42, cover 44, O-ring 46, and pressure gauge 48. Depth filtration vessel 24, considered the primary depth filter, includes replaceable filtering components including mesh bag 50, filter bag 52 and filter basket 54 for retaining same. Mesh bag 50 provides initial filtering with filter bag 52 performing the depth filtration. Alternatives to mesh bag 52 could be employed such as 20 suitable screens or other filtering structures and material. Although mesh bag 50 is not necessary to practice the invention, it is believed that mesh bag is an economical way of providing initial solids filtration from purged materials from the preferred vortex separator in the course filtration means as more fully described below.

Depth filtration vessel 26, considered the secondary filter vessel, also includes filter bag 56 and filter basket 58. Vessel 24 includes inlet 60 and is connected to vessel 26 serially with connection conduit 62. Vessel 26 includes outlet 64.

Thus, in the preferred embodiment, wash solution 10 entering vessel 24 through inlet filters through mesh bag 50 and filter bag 52 and again through filter bag 56 before exiting the depth filtration means. This embodiment provides a double filtering which helps to extend wash solution service life. Of course, each depth filter vessel can be easily cleaned by removing the appropriate mesh and filter bags. Filtered particulate matter can be then safely disposed of in solid form.

Figure 2:
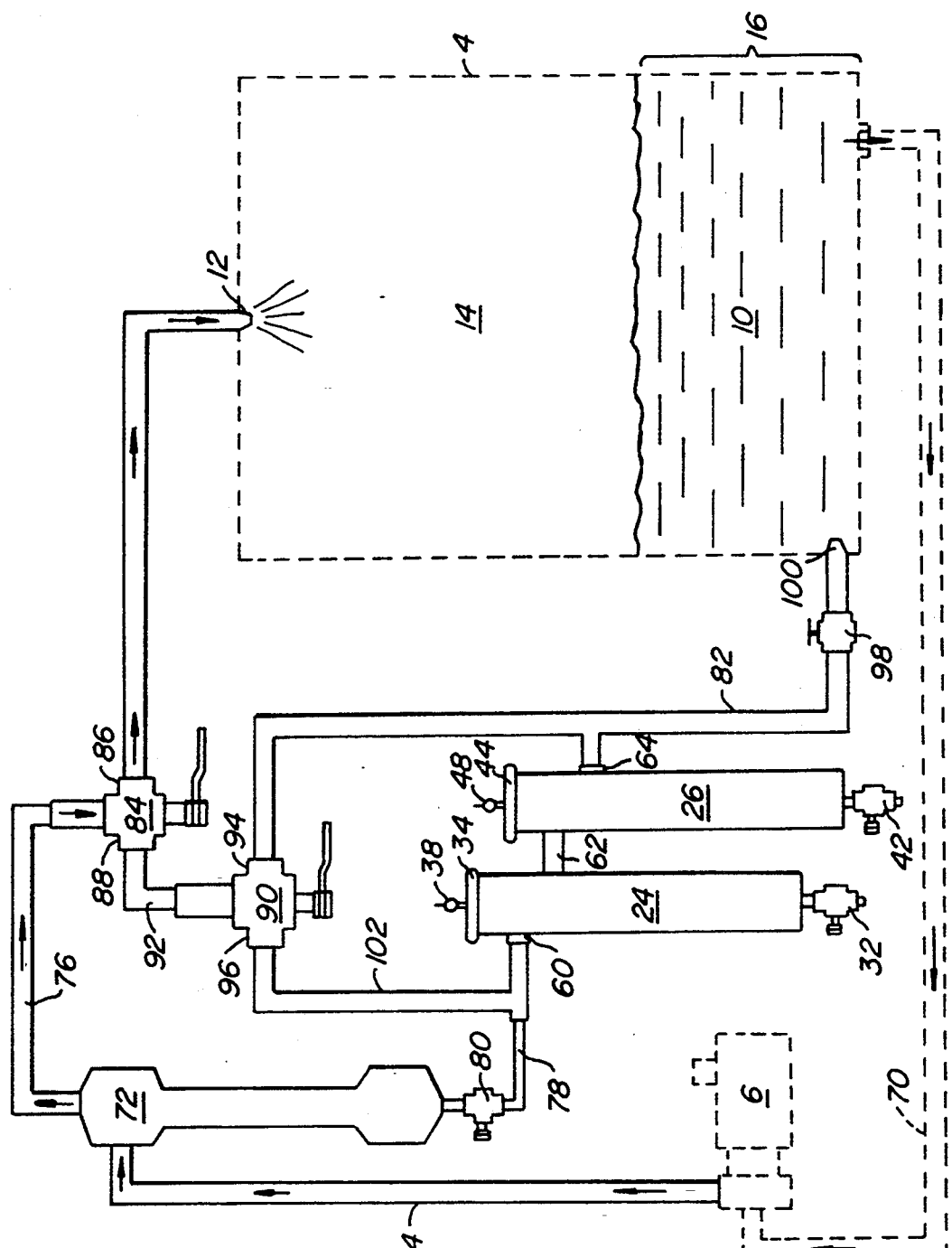
FIG. 2 illustrates a more detailed diagram of the apparatus of FIG. 1 operating in the first operational mode for normal washer spray operation.

As shown in the preferred embodiment of FIG. 2, pump 6 is connected to the washer cabinet outlet line 70 at the base of the washer cabinet 14 to pump wash solution 10 out of cabinet 14 after it has passed over the components being washed (not shown). The centrifugal vortex separator 72 is connected to pump 6 downstream via conduit 74 and is coupled to discharge line 76 Vortex separator 72 also includes purge line 78, having a two-way valve 80, connected to depth filter vessel 24. Depth filter vessel 24 is connected to depth filter vessel 26 through connection conduit 62, and vessel 26 is coupled to wash solution storage container 16 by conduit 82.

Discharge line 76 is connected to a first multi-outlet valve 84 having selectable outlets 86, 88. One outlet 86 is connected to the washer cabinet spray mechanism 12 and the second outlet 88 is connected to a second selectable multi-outlet valve 90 by conduit 92.

Preferably, multi-outlet valves 84, 90 are both conventional commercially available 3-way ball valves. alternatively, 2-way valves could be used or other selectable device. Multi-outlet valve 90 includes outlets 94, 96. Outlet 94 is connected to the base of washer solution storage cabinet 16, preferably through conduit 82 to minimize duplication of hardware. Conduit 82 includes two way valve 98 and connects with washer solution storage cabinet 16 at an appropriate inlet nozzle 100 configured to turbulently dislodge settled solids from the bottom of container 16. Outlet 96 is connected to the depth filter vessel 24 with appropriate conduit 102.

Figure 3:
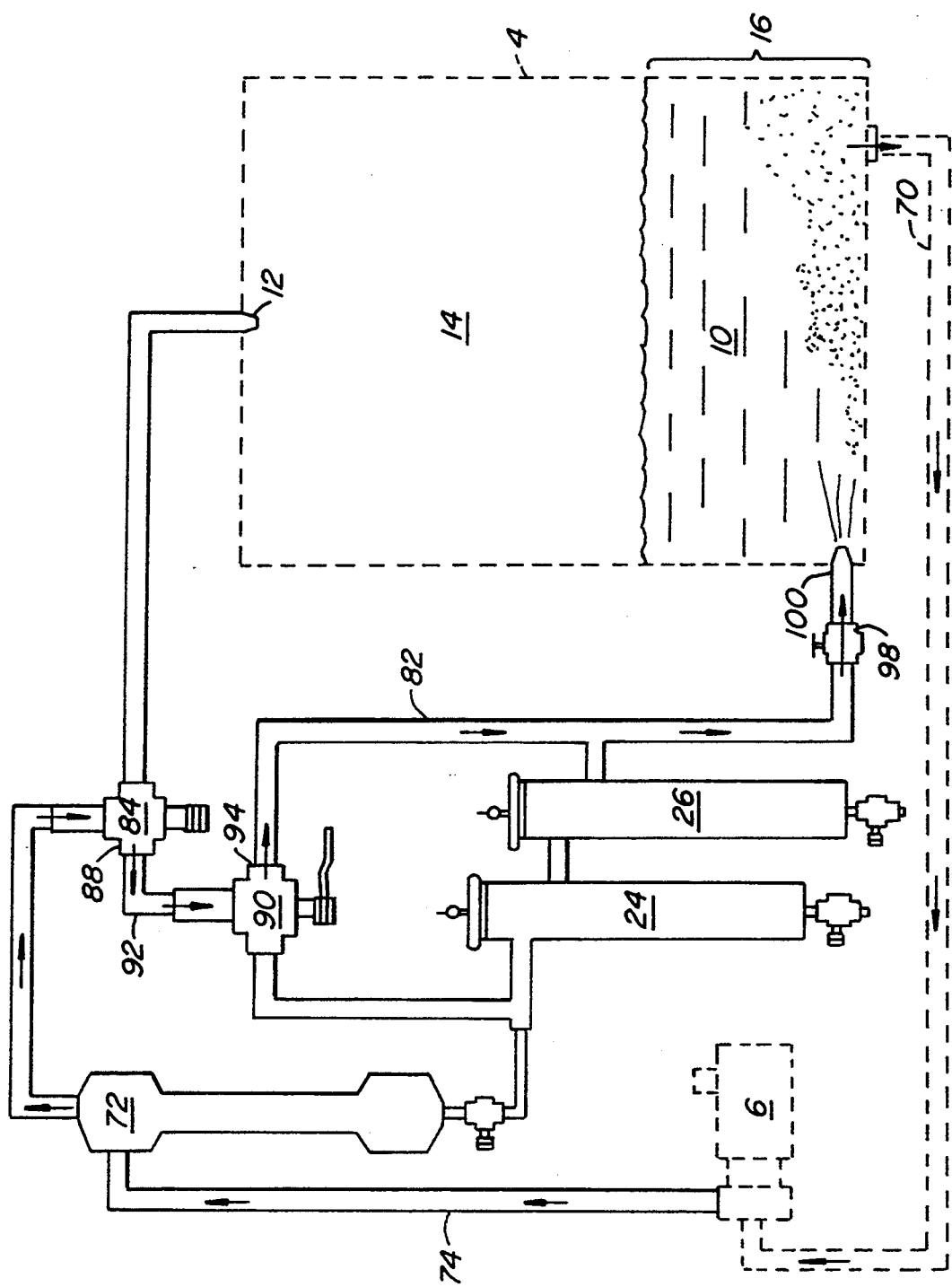
FIG. 3 illustrates the apparatus operating in the second operational mode for washer storage tank cleaning.
Figure 4:
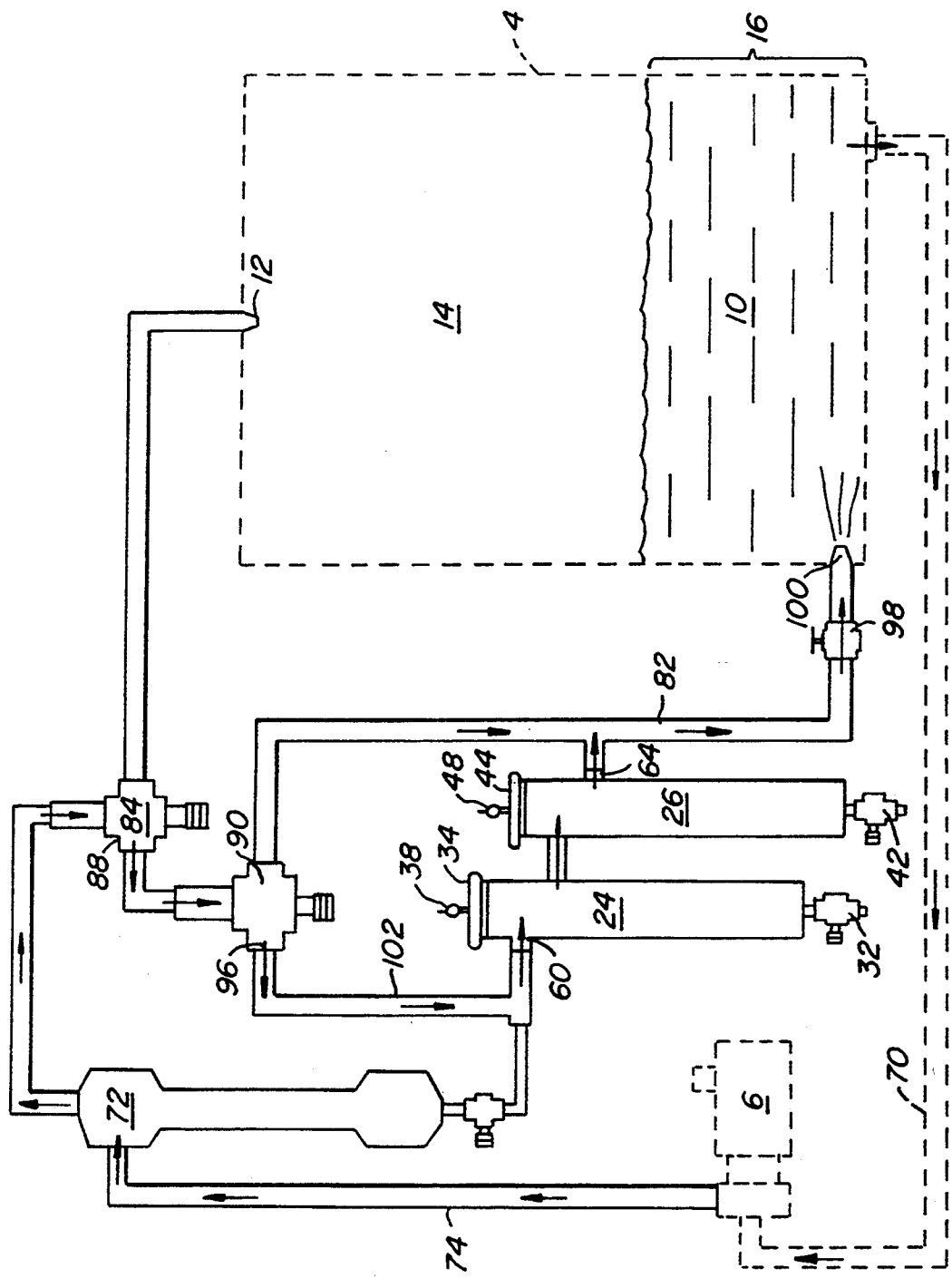
FIG. 4 illustrates the apparatus operating in the third operational mode for facilitating depth filtration of the wash solution.

FIGS. 2-4 show the various flow paths provided for wash solution 10 in each of three available modes of operation. FIG. 2 illustrates mode one, referred to as the normal washer operation mode. Arrows 104 indicate the direction of flow and the wash solution flow path in mode one. Referring to FIG. 2, wash solution 10 is drawn from the wash solution storage container 16 through outlet line 70 to pump 6. Pump displaces the wash solution, under pressure, through conduit 74 to vortex separator 72 where coarse particulate matter and solids (larger than about 75 microns) are filtered out. Wash solution is then routed from vortex separator 40 through discharge line 76 to multi-outlet valve 84, a 3-way ball valve. In this mode of operation, valve 84 is set to direct wash solution through pipe means 104 to the washer 4.

During this mode of operation (mode one) vortex separator 72 is intermittently purged through purge line 78 by opening valve 80 and allowing wash solution with accumulated particulate matter from vortex separator 84 to flow into inlet 60 of depth filter vessel 24 where mesh bag 50 and filter bag 52 capture the purged solids. Filter vessel 26 with capture excess solids not filtered in vessel 24. The pressure gauges 38, 48 on vessels 24, 26 respectively will indicate when it is appropriate clean the depth filter vessels. Cleaning is accomplished simply by stopping flow to depth filtration using appropriate valves 80, 90 or by shutting down the pump 6 and removing covers 34, 44, removing filter bags 52, 56 and mesh bag 50 and replacing with clean bags.

FIG. 3 illustrates system operation in mode two, the wash solution storage container cleaning mode. In this mode, just as in mode one, wash solution is drawn from washer solution storage container 16 through outlet line 70 to pump 6 from which it is routed, under pressure, through conduit 74 to vortex separator 72 where coarse solids are removed. In mode two, valve 84 is set to direct the wash solution overflow from vortex separator through outlet 88, conduit 92 and into valve 90. Valve 90 in this mode is set to direct the flow through outlet 94, conduit 82 and into wash solution storage container 16 where the high velocity flow cleans the container 16 of accumulated solids. In some washer storage container configurations, cleaning may be facilitated by installation of an appropriate container spray bar (not shown). Mode two can be operated anytime that spray mechanism 12 is not in use. Duration of mode two will depend upon the amount of accumulated solids in container 16. It is preferred that mode two be operated at least daily in normal circumstances to avoid solids from becoming packed in container 16.

It is also preferred that during mode 2 operation, vortex separator 72 be purged of solids continuously through valve 80, which is left in the open position, through purge line 78 to inlet 60 of depth filter vessel 24. No dedicated pump action is normally required for this purge and simultaneous purging of separator 72 with cleaning of container 16 reduces down time for parts washing.

FIG. 4 illustrates system operation in mode three, named depth filtration mode. In this mode, wash solution is drawn from washer solution storage container 16, through pump 6 and through vortex separator as with the previous modes described. In this mode, however, valves 84 and 90 are set to direct wash solution flow into depth filter vessels 24, 26 to filter out fine particulate matter from the wash solution. As previously described, depth filtration means 20 does not require dual filter vessels as in the preferred embodiment. Dual depth filter vessels are preferred, however, to effectively remove hard burnt carbon, small micron dirt particles and emulsified oil from the wash solution to provide enhanced service life extension of the solution.

The inventive method is directed to the use of the above described apparatus and modes of operation to provide effective filtering of the particulate matter and increasing service life of the wash solution. The method includes using each operational mode and cleaning the depth filter to remove collected particulate matter from the system. The vortex separator 72 is cleaned by purging to the depth filter vessels 24, 26. In the first and third modes, vortex separator 72 is preferably purged intermittently. In the second mode (washer storage tank cleaning) vortex separator 72 is preferably purged continuously.

The method uses the first operational mode is for normal washer operation, the second mode to direct high velocity flow into accumulated particulate matter collected at the bottom of the wash solution storage cabinet 16 to turbulently suspend the particulate matter in the wash solution flow where it is subsequently swept into the vortex separator and filtered. In the third mode, the wash solution flow is routed for depth filtration an recirculated into the washer 4. Periodic operation in mode three, preferably after the wash solution has settled overnight, significantly enhances service life of the wash solution.

The foregoing description of the illustrative embodiments is provided for purposes of description and is not intended to limit the invention to the precise form disclosed. For example, valves 84, 90 can be automatically controlled rather than manually controlled if desired. A suitable timer and controller would be used with the appropriate valve like devices to allow the system to cycle through the various operational modes at pre-programmed times or when particular amounts of particulate matter is filtered and detected by appropriate sensors. Additionally, the invention is not intended to be limited to the exact form and configuration disclosed. One of ordinary skill could combine various components described in the above description or use various substitutes and modifications which are more appropriate for the particular application without deviating from the spirit and scope of the invention, It is intended that the scope of the invention be defined by the claims appended hereto.

I claim:

1. A method for removing particulate matter from aqueous wash solutions used in parts washing devices comprising the following steps:
   providing a parts washer device having a washer cabinet, the washer cabinet including a wash solution inlet means, a wash solution storage portion, a wash solution storage portion outlet means and a wash solution storage portion inlet means;
   providing a wash solution pump having a pump inlet and a pump outlet;
   providing means for course particulate matter filtration, the course filtration means configured to filter particulate sized down to approximately 75 microns from an aqueous wash solution;
   providing means for depth filtration configured to filter particulate matter smaller than 75 microns an aqueous wash solution; and
   providing means for directing aqueous wash solution, driven by said wash solution pump, through selectable flow paths;
   directing the aqueous wash solution along a first flow path using said directing means, the first flow path channeling the aqueous wash solution from the washer storage portion through the course filtration means and to the wash solution inlet bypassing the depth filtration means;
   directing the aqueous wash solution along a second flow path using said directing means, the second flow path channeling the aqueous wash solution from the washer storage portion through the course filtration means and to the washer storage portion bypassing the depth filtration means, and
   directing the aqueous wash solution along a third flow path using said directing means, the third flow path channeling the aqueous wash solution from the washer storage portion through the course filtration means and through the depth filtration means before entering the washer storage portion.

2. The method of claim 1 further comprising the step of purging accumulated particulate matter from the course filtration means to the depth filtration means.

3. The method of claim 1 wherein the directing through the third flow path step is repeated intermittently during operation of the parts washer device.

4. The method of claim 1 wherein the directing through the second flow path is repeated intermittently during operation of the parts washer device.

5. The method of claim 1 further comprising the step of removing accumulated particulate matter from the depth filtration means.

6. The method of claim 1 wherein the course filtration means includes a vortex centrifuge separator.

7. The method of claim 1 wherein the depth filtration means includes a filter vessel having a housing, a removable filter basket disposed in said housing, and a removable filter bag disposed in said filter basket.

8. A method of removing solids from aqueous wash solution in a washer system, the washer system having a washer storage container, the method comprising the following steps:

filtering course particulate matter from the wash solution continuously during operation of said washer system;

filtering fine particulate matter from the wash solution intermittently during operation of said washer system; and directing turbulent flow of said wash solution into the washer storage container intermittently during operation of the washer system to cause flow of the wash solution to carry away accumulated particulate matter and solids from the washer storage container and filtering said accumulated particulate matter and solids from the wash solution.

9. The method of claim 8 wherein the course particulate matter includes substantially all particulate matter sized greater than 75 microns.

10. The method of claim 8 wherein the fine particulate matter includes substantially all particulate matter sized between 50–75 microns.

11. The method of claim 8 wherein the course filtering step incorporates the use of a course filtration means and the fine filtration step incorporates the use of a depth filtration means, the methods comprising the additional step of purging accumulated particulate matter from the course filtration means to the depth filtration means intermittently during the operation of the washer system.

* * * * *